United States Patent
Whikehart et al.

(10) Patent No.: US 6,952,587 B2
(45) Date of Patent: Oct. 4, 2005

(54) ANTENNA BEAM STEERING RESPONSIVE TO RECEIVER AND BROADCAST TRANSMITTER

(75) Inventors: J. William Whikehart, Novi, MI (US); Jack Harold King, Howell, MI (US); John Elliott Whitecar, Plymouth, MI (US); Michael Chrysochoos, Toledo, OH (US); Philip Mark Bator, Farmington, MI (US); Richard Zerod, Livonia, MI (US)

(73) Assignee: Visteon Global Technologies, Inc., Van Buren Township, MI (US)

(*) Notice: Subject to any disclaimer, the term of this patent is extended or adjusted under 35 U.S.C. 154(b) by 477 days.

(21) Appl. No.: 10/058,482

(22) Filed: Jan. 28, 2002

(65) Prior Publication Data

US 2002/0115452 A1 Aug. 22, 2002

Related U.S. Application Data

(63) Continuation-in-part of application No. 09/506,294, filed on Feb. 17, 2000, now Pat. No. 6,470,186.

(51) Int. Cl.$^7$ .......................... H04Q 7/20; H04B 7/14
(52) U.S. Cl. .................. 455/456.1; 455/404.2; 455/562.1; 455/569.2; 455/575.7; 455/575.9; 455/19
(58) Field of Search .................. 455/456.1–456.6, 455/404.2, 427, 12.1, 457, 562.1, 569.2, 19, 575.5, 575.9

(56) References Cited

U.S. PATENT DOCUMENTS

| | | | |
|---|---|---|---|
| 4,217,587 A | 8/1980 | Jacomini | |
| 4,688,092 A * | 8/1987 | Kamel et al. | 348/147 |
| 4,850,037 A | 7/1989 | Bochmann | |
| 4,929,791 A | 5/1990 | Kaeding | |
| 5,027,302 A * | 6/1991 | Asanuma et al. | 701/48 |
| 5,268,968 A | 12/1993 | Yoshida | |
| 5,283,780 A | 2/1994 | Schuchman et al. | |
| 5,488,559 A | 1/1996 | Seymour | |
| 5,559,806 A * | 9/1996 | Kurby et al. | 370/325 |
| 5,673,324 A | 9/1997 | Kasser et al. | |
| 5,754,139 A * | 5/1998 | Turcotte et al. | 342/373 |
| 5,778,324 A | 7/1998 | Smith | |
| 5,872,540 A * | 2/1999 | Casabona et al. | 342/362 |
| 6,016,120 A | 1/2000 | McNabb et al. | |
| 6,061,561 A | 5/2000 | Alanara et al. | |
| 6,167,276 A | 12/2000 | Pite | |
| 6,188,356 B1 | 2/2001 | Kitayoshi | |
| 6,191,736 B1 | 2/2001 | Yukitomo et al. | |
| 6,195,559 B1 * | 2/2001 | Rapeli et al. | 455/500 |
| 6,271,798 B1 | 8/2001 | Endo et al. | |
| 6,298,243 B1 * | 10/2001 | Basile | 455/552.1 |
| 6,339,707 B1 | 1/2002 | Wainfan et al. | |
| 2001/0003443 A1 * | 6/2001 | Velazquez et al. | 342/367 |
| 2001/0018327 A1 * | 8/2001 | Houston et al. | 455/13.2 |

FOREIGN PATENT DOCUMENTS

| | | |
|---|---|---|
| EP | 0661522 A1 | 7/1995 |
| EP | 0661522 | 7/1995 |
| EP | 0661522 B1 | 7/1998 |

* cited by examiner

*Primary Examiner*—Sonny Trinh
*Assistant Examiner*—Huy Phan
(74) *Attorney, Agent, or Firm*—Brinks Hofer Gilson & Lione

(57) ABSTRACT

A method of controlling an antenna signal combiner in a vehicle having multiple antenna elements, a navigational system and a receiver comprising the steps of receiving signals from at least one transmitter, determining first position coordinates of the vehicle using the navigational system, determining second position coordinates of the at least one transmitter, and combining signals from the multiple antenna elements to steer an antenna beam from the first position coordinates to the second position coordinates.

12 Claims, 6 Drawing Sheets

| TABLE ADDRESS | COEFFICIENTS | | | | STEER TO (A1) |
|---|---|---|---|---|---|
| 0 | a1, 1 p1, 1 | a2, 1 p2, 1 | a3, 1 p3, 1 | a4, 1 p4, 1 | 0 DEGREES |
| 1 | a1, 2 p1, 2 | a2, 2 p2, 2 | a3, 2 p3, 2 | a4, 2 p4, 2 | 10 DEGREES |
| 2 | a1, 3 p1, 3 | a2, 3 p2, 3 | a3, 3 p3, 3 | a4, 3 p4, 3 | 20 DEGREES |
| 3 | a1, 4 p1, 4 | a2, 4 p2, 4 | a3, 4 p3, 4 | a4, 4 p4, 4 | 30 DEGREES |
| 4 | a1, 5 p1, 5 | a2, 5 p2, 5 | a3, 5 p3, 5 | a4, 5 p4, 5 | 40 DEGREES |
| 5 | a1, 6 p1, 6 | a2, 6 p2, 6 | a3, 6 p3, 6 | a4, 6 p4, 6 | 50 DEGREES |
| 6 | a1, 7 p1, 7 | a2, 7 p2, 7 | a3, 7 p3, 7 | a4, 7 p4, 7 | 60 DEGREES |
| 7 | a1, 8 p1, 8 | a2, 8 p2, 8 | a3, 8 p3, 8 | a4, 8 p4, 8 | 70 DEGREES |
| * | * | * | * | * | * |
| * | * | * | * | * | * |
| * | * | * | * | * | * |
| * | * | * | * | * | * | ly well-known broadcast transmitter location input 19 are
ANTENNA BEAM STEERING RESPONSIVE TO RECEIVER AND BROADCAST TRANSMITTER The present invention is a Continuation in Part of application Ser. No. 09/506,294 filed Feb. 17, 2000, now U.S. Pat. No. 6,470,186, and generally relates to a method and apparatus for controlling an antenna signal combiner in a vehicle to steer an antenna beam toward a broadcast transmitter.

BACKGROUND OF THE INVENTION

A primary source of noise and distortion in radio receivers is from multipath interference. This is a localized effect resulting from interaction between separate signals from a transmitter or multiple transmitters which traverse different paths (e.g., via reflections) to reach a receiving antenna. Because of the superposition of several signals (i.e., echoes and/or direct waves), the signal strength of the received signal changes drastically and may fall below the noise floor. Based upon the differences in path lengths of each received wave, the multipath distortion or fading may include short time delayed multipath interference and/or long-time delayed multipath interference signals. The multipath interference depends upon diverse geographic features and buildings. In an urban area with high buildings along both sides of a street, for example, the broadcast waves propagate along the street and become mixed with many short-time delayed signals. Along a riverside, long-time delayed signals may be mixed with both direct and quasi-direct signals. In a basin, there may be several long-time delayed signals arriving from different directions. This variability has made it difficult to solve the problem of multipath distortion in mobile radio receivers.

A well-known means for reducing multipath distortion is through use of space-diversity antennas in a radio receiver system. By switching between antenna signals from spaced apart antennas, specific multipath events can be avoided if the antenna spacing is enough to insure that both antennas will not experience the same multipath event at the same time. However, since space diversity radio receiver systems cannot select only a single wave, they cannot completely avoid multipath distortion. The distortion is especially serious in longtime delay multipath conditions, such as may exist at a riverside or in a basin.

Another technique that has been used to reduce multipath interference is known as antenna beam steering. These systems use an antenna array which is operated in a manner to receive broadcast waves from substantially a single direction only.

In the past, beam steering systems have not had any way of accounting for vehicle changes in orientation or direction and were limited to periodic sampling of signals from various directions to find the beam steering direction which gives the best reception. As the vehicle changes direction, beam steering systems will loose best reception momentarily as the system restores the beam direction to account for the vehicle change in direction.

SUMMARY OF THE INVENTION

The present invention has the advantage of providing a mobile receiver with greatly reduced multipath distortion, better and faster tracking of broadcast signals, and less complexity while maintaining reasonable gain for the desired signal.

In one aspect of the invention, a method is provided for controlling an antenna signal combiner in a vehicle having multiple antenna elements, a navigational system and a receiver. The method includes receiving signals from at least one transmitter. Then determining first position coordinates of the vehicle using the navigational system. Next, second position coordinates of the at least one transmitter are determined, and then signals from the multiple antenna elements are combined to steer an antenna beam from the first position coordinates to the second position coordinates.

DETAILED DESCRIPTION OF THE INVENTION

Figure 1:
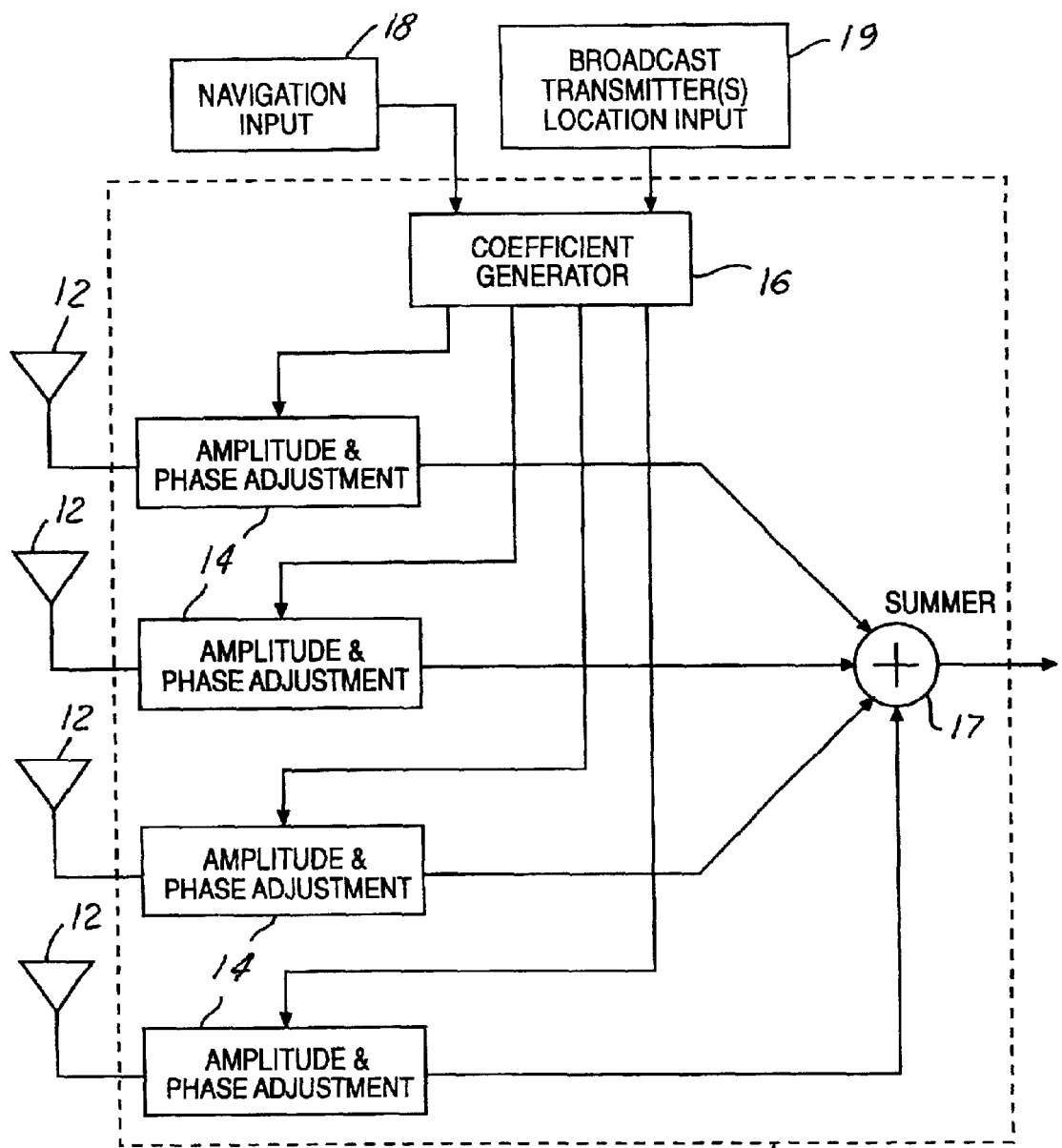
FIG. 1 is a block diagram depicting an antenna combiner which utilizes the present invention.
Figure 2A:
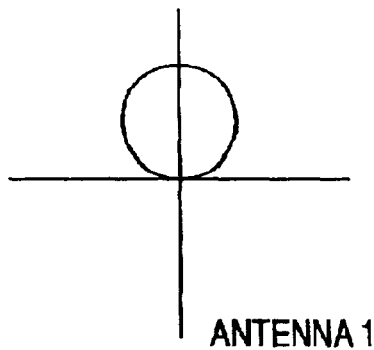
FIGS. 2a to 2e are antenna gain plots depicting the combination of four antenna patterns into a resultant antenna pattern in a horizontal plane.
Figure 2B:
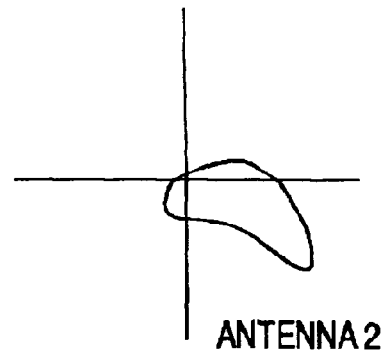
Figure 2C:
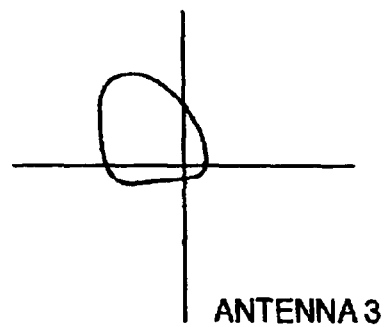
Figure 2D:
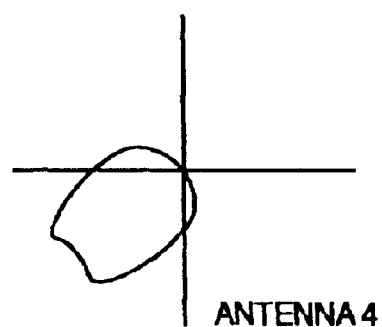
Figure 2E:
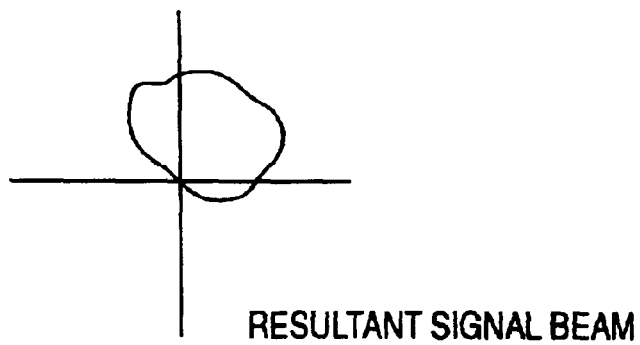

FIG. 1 shows an antenna combiner 10 which utilizes navigational data and multiple broadcast transmitter position data to greatly reduce multipath distortion while maintaining reasonable gain of a desired signal. A plurality of antenna elements 12 coupled to a broadcast receiver, a navigation input 18, and a broadcast transmitter location input 19 are coupled to an antenna combiner 10 which combines received broadcast signals into a single resultant antenna signal. Broadcast signals can be transmitted from any source including, but not limited to, a satellite or multiple satellites or a broadcast transmitter. Antenna combiner 10 comprises a plurality of amplitude and phase adjuster circuits 14, a coefficient generator 16, and a summer 17. Coefficient generator 16 generates beam steering coefficients which are transferred to amplitude and phase adjuster circuits 14 for any predetermined beam steering angle. In a mathematical sense, the beam steering coefficients are a set of complex numbers which multiply the received broadcast signals. Any well-known beam steering equation can be used to combine the received broadcast signals.

Navigation input 18 and broadcast transmitter location input 19 are coupled to coefficient generator 16 wherein coefficient generator 16 selects appropriate coefficients to provide an antenna beam steering pattern oriented toward the locations of one or more broadcast transmitters.

Figure 3A:
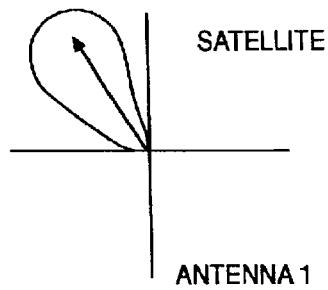
FIG. 3a to 3c are antenna gain plots depicting the combination of two different signal sources into a resultant antenna pattern in a vertical plane.
Figure 3B:
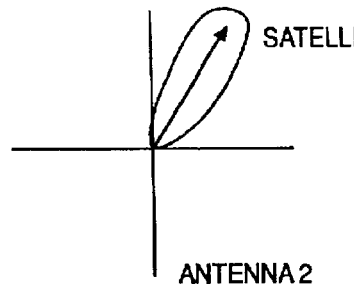
Figure 3C:
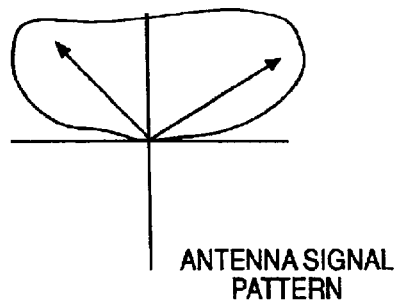

Summer 17 sums the complex numbers, which represent the broadcast signals, from amplitude and phase adjuster circuits 14 into a resultant antenna signal. The resultant antenna signal has a corresponding antenna beam which is based on the summing of the incoming signals as seen in FIG. 2 and FIG. 3 if multiple broadcast transmitters are used. This resultant antenna beam is steered to insure that the resultant signal is directed towards the broadcast transmitter location(s).

Navigation input 18 is derived from a vehicle navigational system or other vehicle localizer. The navigational system/ vehicle localizer detects the vehicle's position and heading, referred to as first position coordinates. As the vehicle's position and direction changes, a signal containing a new position/heading is sent to the antenna combiner where it is received by coefficient generator 16. The navigational system/vehicle localizer can be a GPS receiver or can utilize a tire rotation monitor and/or a vehicle turn indicator with map matching to generate a vehicle location and heading in a conventional manner. The GPS receiver utilizes satellite reference signals to determine a vehicle location and heading.

Amplitude and phase adjuster circuits 14, coefficient generator 16, and summer 17 can be software routines within an embedded processor of any type commonly used in automotive applications for digital signal processing.

Broadcast transmitter location input 19, referred to as second position coordinates, is preferably derived using Keplerian elements when the transmitter is a satellite. The broadcast transmitter localizer can reside within the broadcast receiver or be a separate unit. The database can be updated by an operator manually through an interface or by a software download of the broadcast transmitter positions. The broadcast transmitter localizer can also permit broadcast transmitter location 19 to be manually inputted through an operator interface if the location is not already available in the database.

Figure 7:
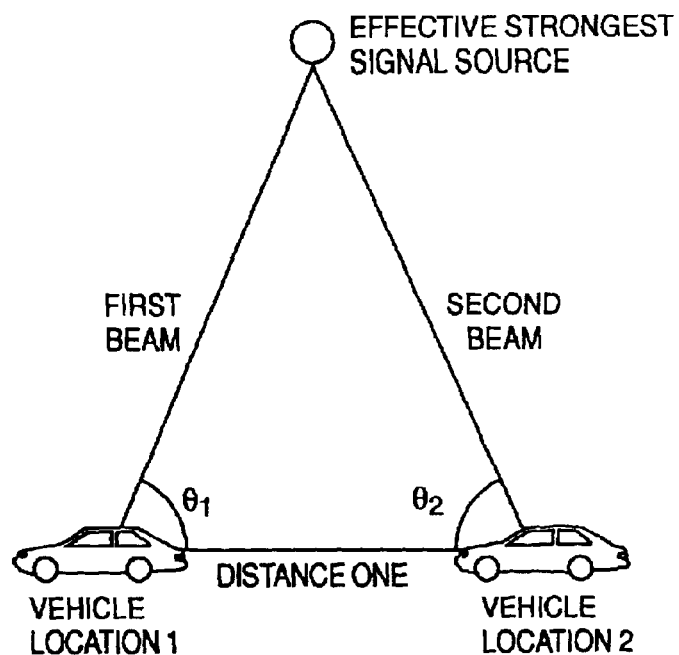
FIG. 7 is a diagram depicting triangulation.

Another way to compile broadcast transmitter locations for the database is to use triangulation during vehicle travel if the radio receiver has the capability of the prior art to steer the antenna beam in response to received signal strength. Triangulation, as seen in FIG. 7, comprises using the position of the vehicle and an antenna beam steering angle at two different locations while receiving from the same broadcast transmitter to estimate the transmitter location. At a first vehicle position, a first steering angle (q1) has a first beam direction derived from the steering of a beam utilizing a conventional beam steering system. At a second vehicle position, a second steering angle (q2) has a second beam direction derived from the steering of a beam utilizing a conventional beam steering system. The distance between the first vehicle position and the second vehicle position (distance one) makes up a first side of a triangle. The first and second beam directions define a second side and a third side of the triangle respectively. Using trigonometric principles, the position of the broadcast transmitter can be calculated. The broadcast transmitter position can then be stored in a table or in a memory location for later use either alone or in conjunction with conventional beam steering.

The position of the broadcast transmitter can also be obtained by having the broadcast transmitter transmit its position coordinates directly to the vehicle. These second position coordinates can be encoded within a subcarrier of the broadcast signal and decoded by the vehicle when received.

Figure 5:
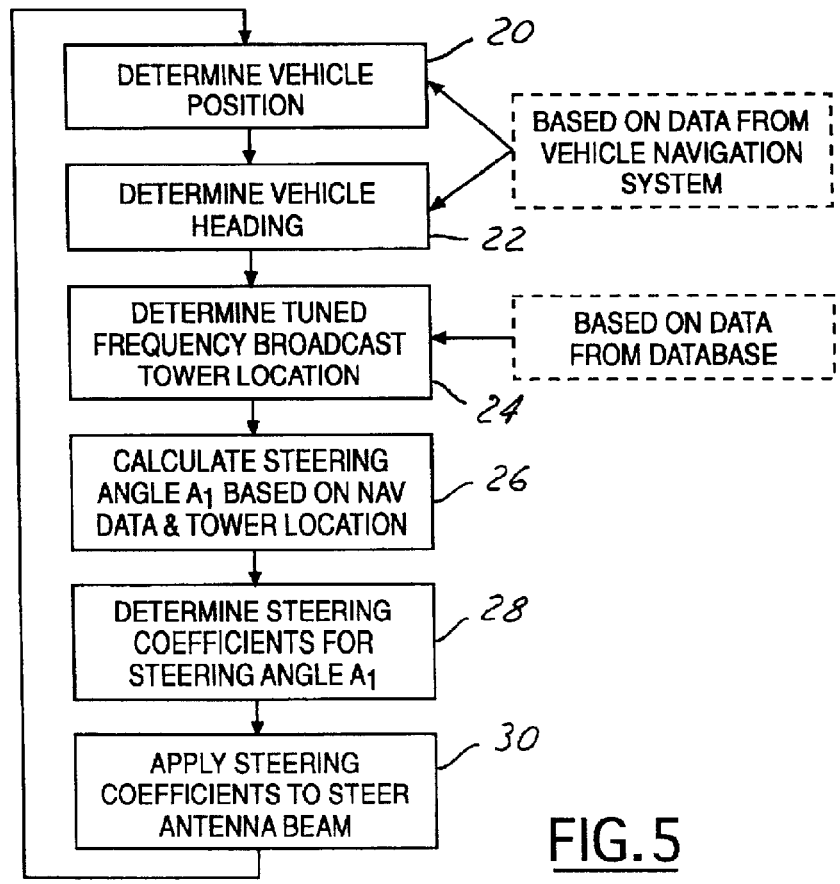
FIG. 5 is a flowchart of a preferred embodiment of the invention.
Figures 4A, 4B:
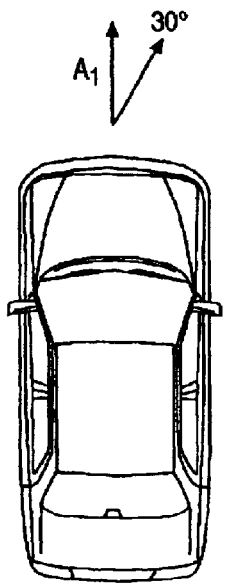
FIGS. 4a and 4b are a depiction of coefficients found in a table based on a steering angle.

A preferred method of controlling an antenna signal combiner in a vehicle having multiple antennas will be described in connection with the flowchart of FIG. 5. While receiving broadcast signals, the vehicle position and heading (first position coordinates), are determined by the navigation system in steps 20 and 22. Next, the position of the broadcast transmitter (second position coordinates) is determined by the broadcast transmitter localizer in step 24. An antenna steering angle (A1), is calculated by an antenna steering angle generator based upon the position of the transmitter, the position of the vehicle, and the heading of the vehicle in step 26. After the steering angle is calculated, steering coefficients are determined by the coefficient generator based on the steering angle (A1) in step 28. The steering coefficients are selected from a table which contains a steering angle with corresponding coefficients. For example, if the steering angle is equal to 20 degrees then a table address pointer will be pointing at a table address of 2. Corresponding coefficients will be chosen accordingly. If the vehicle's location or heading changes such that the new steering angle is 30 degrees, corresponding coefficients which represent a steering angle 30 degrees are selected as seen in FIG. 4a and FIG. 4b. If the table address pointer is initially located at table address 2, the turn will cause the table address pointer to be adjusted to table address 3 and appropriate coefficients will be chosen. The coefficients within the table are generated by means well known in the art. The steering coefficients are then applied to the amplitude and phase adjuster circuits to steer the antenna beam towards the broadcast transmitter in step 30.

Figure 6:
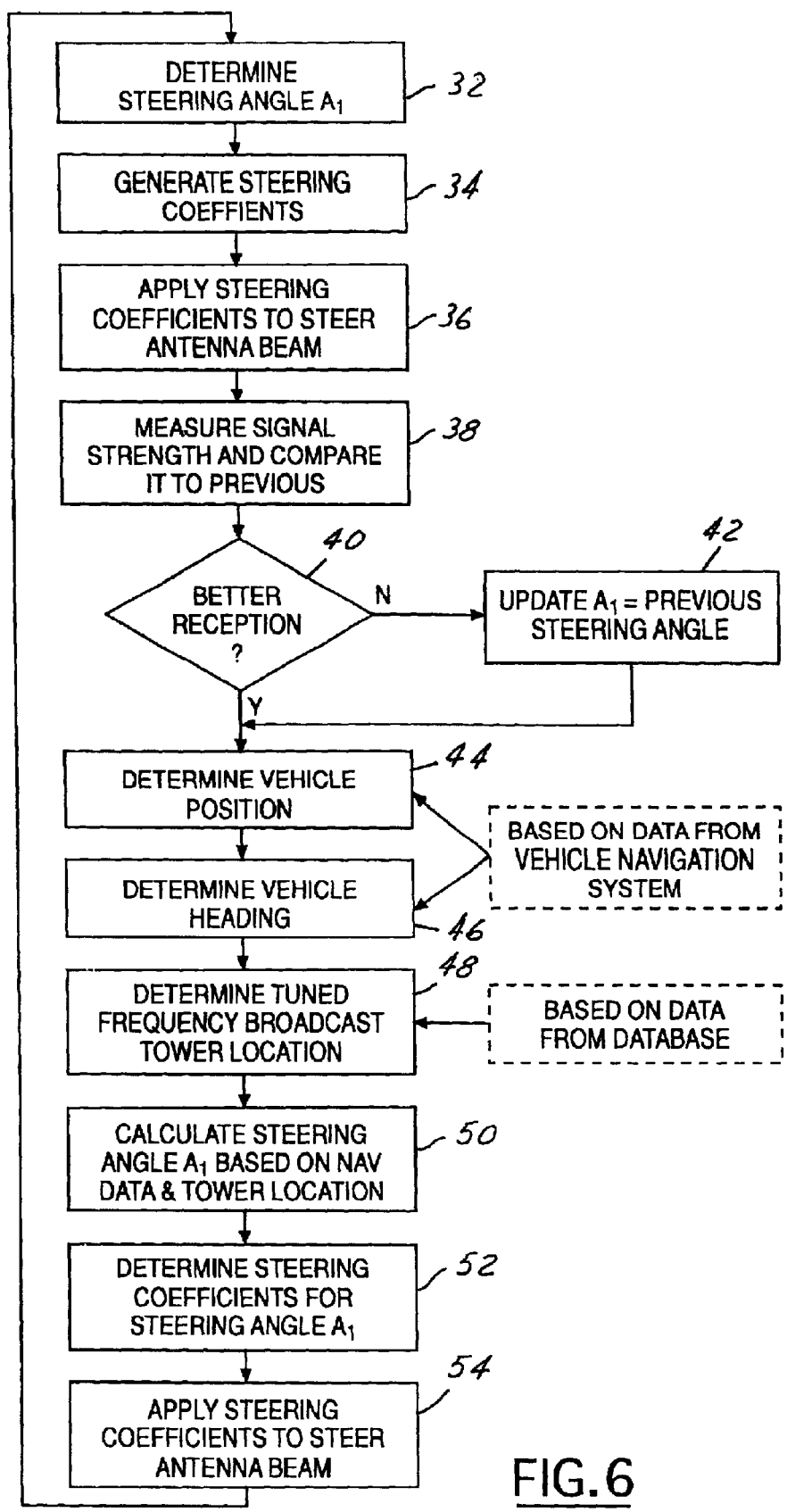
FIG. 6 is a flowchart of an alternative embodiment of the invention.

Referring to FIG. 6, an alternative embodiment is shown. While receiving broadcast signals, a steering angle (A1) is calculated using a conventional beam steering technique in step 32. Steering coefficients are then generated in response to the steering angle in step 34. The steering coefficients are then applied to steer an antenna beam in step 36. A signal strength is measured in step 38 and compared to a previous measured signal. If better reception is not acquired in step 40 then the steering angle (A1) is updated to equal a previous steering angle and corresponding coefficients are applied to steer the antenna beam. If better reception is acquired, the vehicle position and heading (first position coordinates) are determined by the navigation system in steps 44 and 46. Next, the position of the broadcast transmitter (second position coordinates) is determined by the broadcast transmitter localizer in step 48. An antenna steering angle (A1), is calculated by an antenna steering angle generator based upon the position of the transmitter, the position of the vehicle, and the heading of the vehicle in step 50. After the steering angle is calculated, steering coefficients are determined by the coefficient generator based on the steering angle (A1) in step 52. The steering coefficients are selected from a table which contains a steering angle with corresponding coefficients. For example, if the steering angle is equal to 20 degrees then a table address pointer will be pointing at a table address of 2. Corresponding coefficients will be chosen accordingly. If the vehicle's location or heading changes such that the new steering angle is 30 degrees, corresponding coefficients which represent a steering angle 30 degrees are selected as seen in FIG. 4a and FIG. 4b. If the table address pointer is initially located at table address 2, the turn will cause the table address pointer to be adjusted to table address 3 and appropriate coefficients will be chosen. The coefficients within the table are generated by means well known in the art. The steering coefficients are then applied to the amplitude and phase adjuster circuits to steer the antenna beam towards the broadcast transmitter in step 54.

Figure 8:
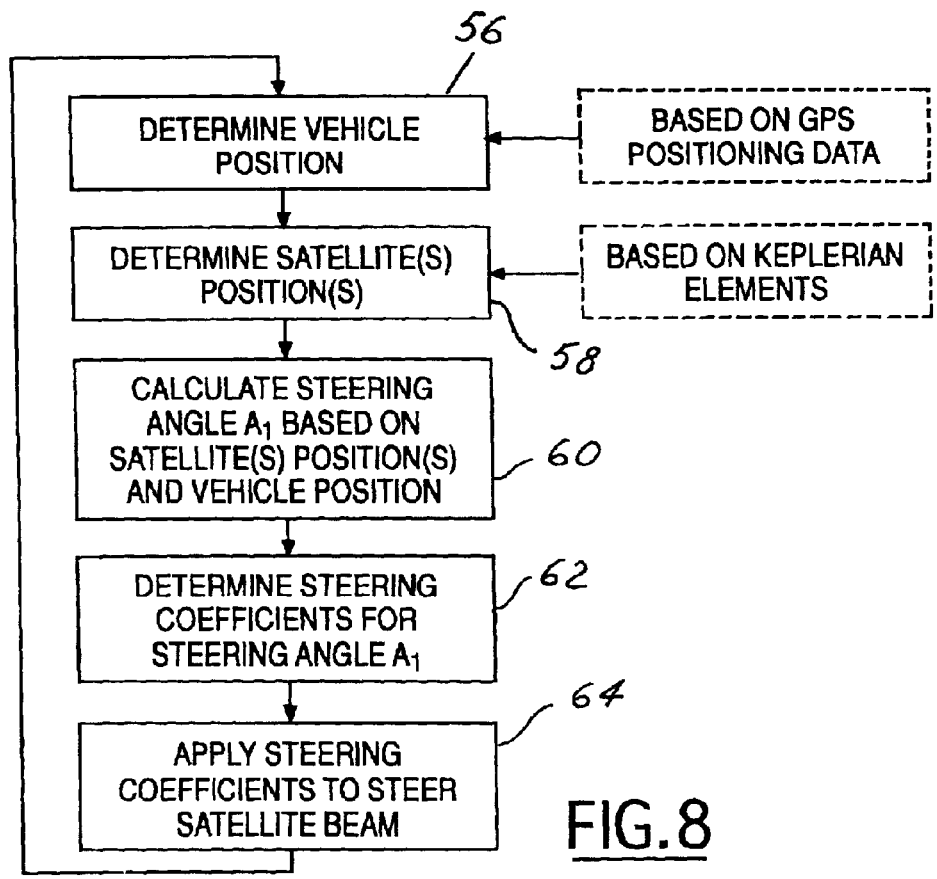
FIG. 8 is a flowchart of an alternative embodiment of the invention.

Referring to FIG. 8, an alternative embodiment is shown. While receiving broadcast signals from multiple transmitters, for instance multiple satellites, the vehicle position (first position coordinates) is determined by the navigation system in step 56. Next, the positions of the multiple satellites (second position coordinates) are determined in step 58. A common method for determining satellite positions is using Keplerian elements. An antenna steering angle (A1) is calculated by an antenna steering angle generator based upon the position of the multiple satellites and the position of the vehicle in step 60. After the steering angle is calculated, steering coefficients are determined by the coefficient generator based on the steering angle (A1) in step 62. The steering coefficients are then applied to the amplitude and phase adjuster circuits to steer a satellite beam towards a resultant satellite pattern.

We claim:

1. A method of controlling an antenna signal combiner in a vehicle having multiple antenna elements, a navigational system and a receiver comprising the steps of:

receiving signals from at least one transmitter;

determining first position coordinates of said vehicle using said navigational system;

determining second position coordinates of said at least one transmitter;

combining signals from said multiple antenna elements to steer an antenna beam from said first position coordinates to said second position coordinates and wherein a steering angle is obtained in response to said first position coordinates and second position coordinates, wherein steering coefficients are determined by a coefficient generator based on said steering signal, and wherein said steering coefficients are applied to steer said antenna beam from said first position coordinates towards said second position coordinates.

2. The method according to claim 1 wherein said second position coordinates are determined using Keplerian elements.

3. The method according to claim 1 wherein said first position coordinates are derived from a GPS receiver.

4. The method according to claim 1 wherein said second position coordinates are derived from a manual input.

5. The method according to claim 1 wherein said second position coordinates are broadcast by said at least one transmitter.

6. The method according to claim 1 wherein said second position coordinates are derived using triangulation.

7. A broadcast receiver for a vehicle having multiple antenna elements for receiving broadcast signals comprising:

a vehicle localizer generating first position coordinates;

a broadcast transmitter localizer generating second position coordinates; and an antenna signal combiner steering an effective antenna beam from said first position coordinates toward said second position coordinates; wherein said antenna signal combiner includes an antenna steering angle generator for generating an antenna steering angle based on first position coordinates and said second position coordinates; wherein steering coefficients are generated based on said steering angle by a coefficient generator; wherein said steering coefficients are applied to said antenna signal combiner to steer an effective antenna beam from said first position coordinates toward said second position coordinates.

8. The broadcast receiver according to claim 7 wherein first position coordinates are derived from a vehicle localizer comprising a tire rotation monitor and a vehicle turn indicator.

9. The broadcast receiver according to claim 7 wherein said second position coordinates are derived from a broadcast transmitter localizer comprising a database having locations of predetermined broadcast transmitters.

10. The broadcast receiver according to claim 7 wherein said second position coordinates are derived from a manual input.

11. The broadcast receiver according to claim 7 wherein said second position coordinates are calculated using triangulation.

12. The broadcast receiver according to claim 7 wherein said first position coordinates are derived from a GPS receiver.

* * * * *